United States Patent
Yasuda et al.

[11] Patent Number: 5,995,852
[45] Date of Patent: Nov. 30, 1999

[54] COMMUNICATION TERMINAL EQUIPMENT AND CALL INCOMING CONTROL METHOD

[75] Inventors: Hiroshi Yasuda; Morihiko Hayashi, both of Kanagawa; Michihiro Kaneko, Tokyo; Michihito Nakagawa, Kanagawa, all of Japan

[73] Assignee: Sony Corporation, Tokyo, Japan

[21] Appl. No.: 08/571,650

[22] Filed: Dec. 13, 1995

[30] Foreign Application Priority Data

Dec. 19, 1994 [JP] Japan .................................. 6-335016

[51] Int. Cl.⁶ ........................................................ H04Q 7/32
[52] U.S. Cl. ........................ 455/567; 455/564; 455/550; 455/403; 379/418; 379/355; 379/373
[58] Field of Search .................................. 455/567, 564, 455/550, 403, 572, 575, 412; 379/418, 355, 373; 340/825.44

[56] References Cited

U.S. PATENT DOCUMENTS

| | | |
|---|---|---|
| 4,504,707 | 3/1985 | Lucchesi . |
| 4,935,735 | 6/1990 | DeLuca et al. . |
| 5,233,641 | 8/1993 | Maeda ..................................... 455/567 |
| 5,276,729 | 1/1994 | Higuchi et al. ......................... 455/403 |
| 5,329,577 | 7/1994 | Norimatsu . |
| 5,406,618 | 4/1995 | Knuth et al. ............................ 455/412 |
| 5,442,814 | 8/1995 | Seo ......................................... 455/403 |
| 5,491,745 | 2/1996 | Roeder .................................... 455/564 |
| 5,493,285 | 2/1996 | Yoshizawa .......................... 340/825.44 |
| 5,625,683 | 4/1997 | Nazanin et al. ......................... 379/355 |
| 5,651,052 | 7/1997 | Serrano ................................... 455/567 |
| 5,657,372 | 8/1997 | Ahlberg et al. ......................... 455/403 |

FOREIGN PATENT DOCUMENTS

| | | |
|---|---|---|
| 0275193 | 7/1988 | European Pat. Off. . |
| 0408027 | 1/1991 | European Pat. Off. . |
| 0502617 | 9/1992 | European Pat. Off. . |
| 0772334 | 5/1997 | European Pat. Off. . |
| 0799534A | 4/1995 | Japan . |
| 9413065 | 6/1994 | WIPO . |

*Primary Examiner*—Wellington Chin
*Assistant Examiner*—Keith Ferguson
*Attorney, Agent, or Firm*—Jay H. Maioli

[57] ABSTRACT

In a communication terminal equipment and in a method of controlling call incoming, unnecessary noises in a period from the start of an alert sound to carrying out of the next operation can be reduced. When a predetermined operation is effected under the condition that an alert sound is ringing, the alert sound is stopped or the volume of the alert sound is reduced at least over a duration of call incoming. Thus, such a fear that persons in the surroundings may be troubled by the continuous ringing of the alert sound can be remarkably reduced. Further, since the situation that a power supply is cut off forcibly during call origination can be avoided, the fear that a person on the call origination side may be given an unpleasant feeling can be eliminated.

19 Claims, 5 Drawing Sheets

COMMUNICATION TERMINAL EQUIPMENT AND CALL INCOMING CONTROL METHOD

BACKGROUND OF THE INVENTION

1. Field of the Invention

The present invention relates to a communication terminal equipment, and is applicable to, for example, a portable telephone (such as GSM·USDC·PDC) and a digital cordless telephone (such as PHS·DECT·CT-2).

2. Description of the Related Art

Conventionally, call incoming to a telephone is informed by means of an alert sound. Generally, such an alert sound is designed so that it does not stop ringing before a user effects next operation. Accordingly, when the user cannot give any quick response to the call incoming, there is no way other than the user breaks off the alert sound forcibly by means of going off-hook or leaves the alert sound to continue ringing.

In this case, in the method to forcibly break off the alert sound by means of the off-hook operation, there is a fear that the person on the other side is given an unpleasant feeling because the person on the other side can notice that the circuit was broken off intentionally. On the other hand, in the method to wait until the alert sound stops ringing, there is a fear that persons in the surroundings may be troubled by the alert sound.

Another method is therefore considered in which generation of an alert sound is stopped by a user's operation to intentionally break off power supply while to call is incoming. In this method, however, the turning-on of the power supply again is apt to be forgotten, and there is a possibility of missing the next incoming call. Further, there is a fear that long-time turn-off of power supply may be regarded as a failure in an telephone network. Accordingly, this method is a not so preferable measure.

In view of the foregoing, an object of this invention is to provide a communication terminal equipment which is superior in selecting and handling properties for users in comparison with conventional one.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of the present invention will be described with reference to the accompanying drawings:

(1) General Configuration

In this embodiment, description will be made about a portable telephone in which an alert sound muting function is allotted to a power key for controlling switching of turning on/off power supply to thereby improve the convenience in handling.

Figure 1:
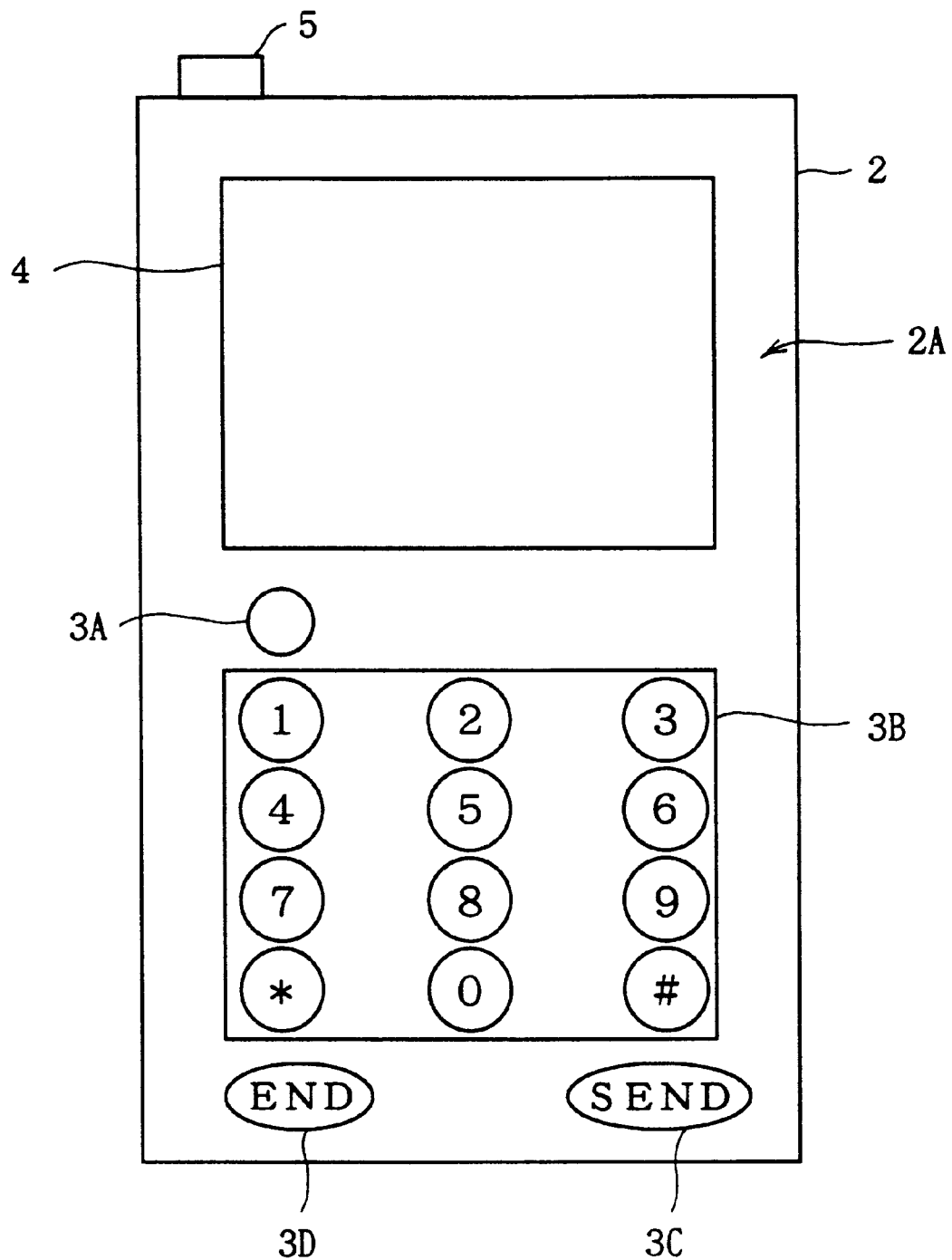
FIG. 1 is a schematic front view showing an example of the communication terminal equipment according to the present invention.

The outline configuration of a portable telephone 1 is shown in FIG. 1.

On a front panel 2A of a body 2 used in this embodiment, there are provided not only operation keys 3 (including a power key 3A, numeral keys 3B, a send key 3C, and an end key 3D), but also a display 4 for displaying a telephone number. On this display 4, a telephone number or the like entered by a user can be displayed. The user can confirm the entered contents or can perform mode selection on a picture screen. Further, in addition to those operation keys 3 and the display 4, an antenna 5 and a speaker/microphone portion 6 (not shown) are provided on the body 2.

Figure 2:
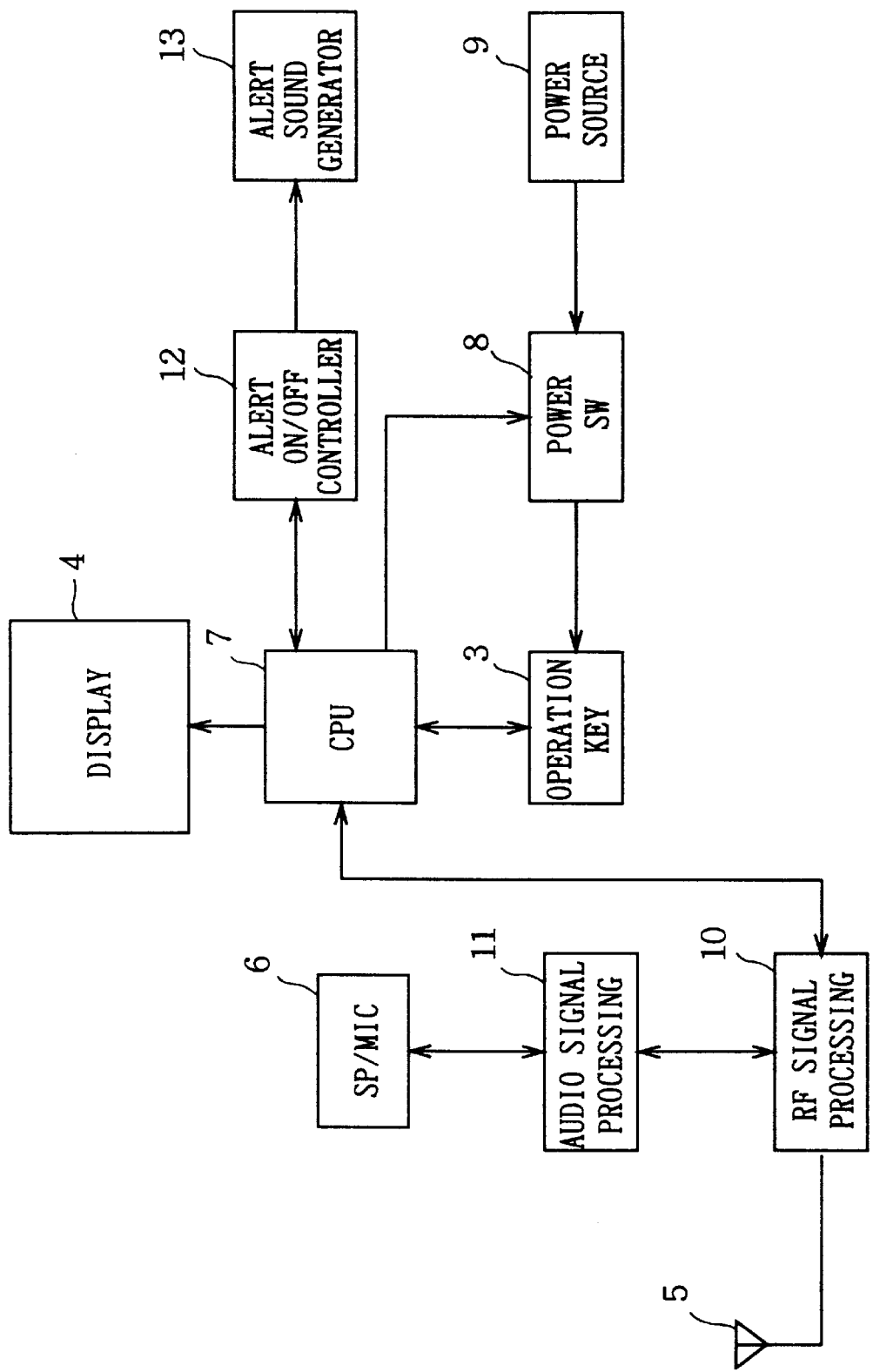
FIG. 2 is a block diagram showing an example of the inner circuit of the communication terminal equipment according to the present invention.

FIG. 2 shows the inner configuration of the portable telephone 1. The inner circuit is constituted by a CPU 7 (control means) as a main part so that the CPU 7 controls other parts of the inner circuit. For example, in the case where the user depresses the power key 3A when the user wishes to originate a call, the CPU 7 performs control to close a power switch 8 so that electric power is supplied from a power source 9. Thus, the portable telephone 1 is brought into a state of standing-by awaiting entering of a telephone number of the other party.

For example, if the user enters the telephone number of the other party through the numeral keys 3B in this state, the CPU 7 displays the thus entered telephone number of the other party on the display 4. If the user operates the send key 3C, the CPU 7 begins call origination to the other party through an RF signal processing portion 10 and the antenna 5.

If the other party responds to the call origination and conversation is started, a reception signal received through the antenna 5 is fetched into an audio signal processing portion 11 through the RF signal processing portion 10, and then the signal is outputted from a speaker of the speaker/microphone portion 6 after signal-processed in the audio signal processing portion 11. On the other hand, the user's voice is fetched into the audio signal processing portion 11 through a microphone of the speaker/microphone portion 6, and transmitted from the antenna 5 through the RF signal processing portion 10 after being signal-processed in the audio signal processing portion 11.

On the contrary, when a call is given to this portable telephone 1 from another party, the CPU 7 detects this call and performs control to turn on an alert on/off controller 12 to thereby make an alert sound generator 13 generate an alert sound. Thus, the user is able to notice the call incoming. In this state, if the user depresses the send key 3C, the CPU 7 detects this depression, so that it enables conversation and stops the generation of the alert sound at the same time. This is a case where the user can respond to a call incoming. However, there is a case where the user cannot respond to a call incoming in accordance with the surroundings at the time of the call incoming. To cope with such a case, therefore, there is provided a function to eliminate an alert sound without forcibly cutting-off a circuit under a predetermined operation.

This operation is carried out by the power key 3A. Normally, the power key 3A is used to open the power switch 8 to thereby break off the power supply from the power source 9 under the condition that the power key 3A is depressed for a predetermined time or more (for example, 1 second or more). If the power key 3A is depressed for a time shorter than a predetermined time (for example, shorter than one second) when an alert sound is being generated, the CPU 7 detects this depression and controls the alert on/off controller 12 to make it stop the generation of the alert sound.

(2) State Transition

Figure 3:
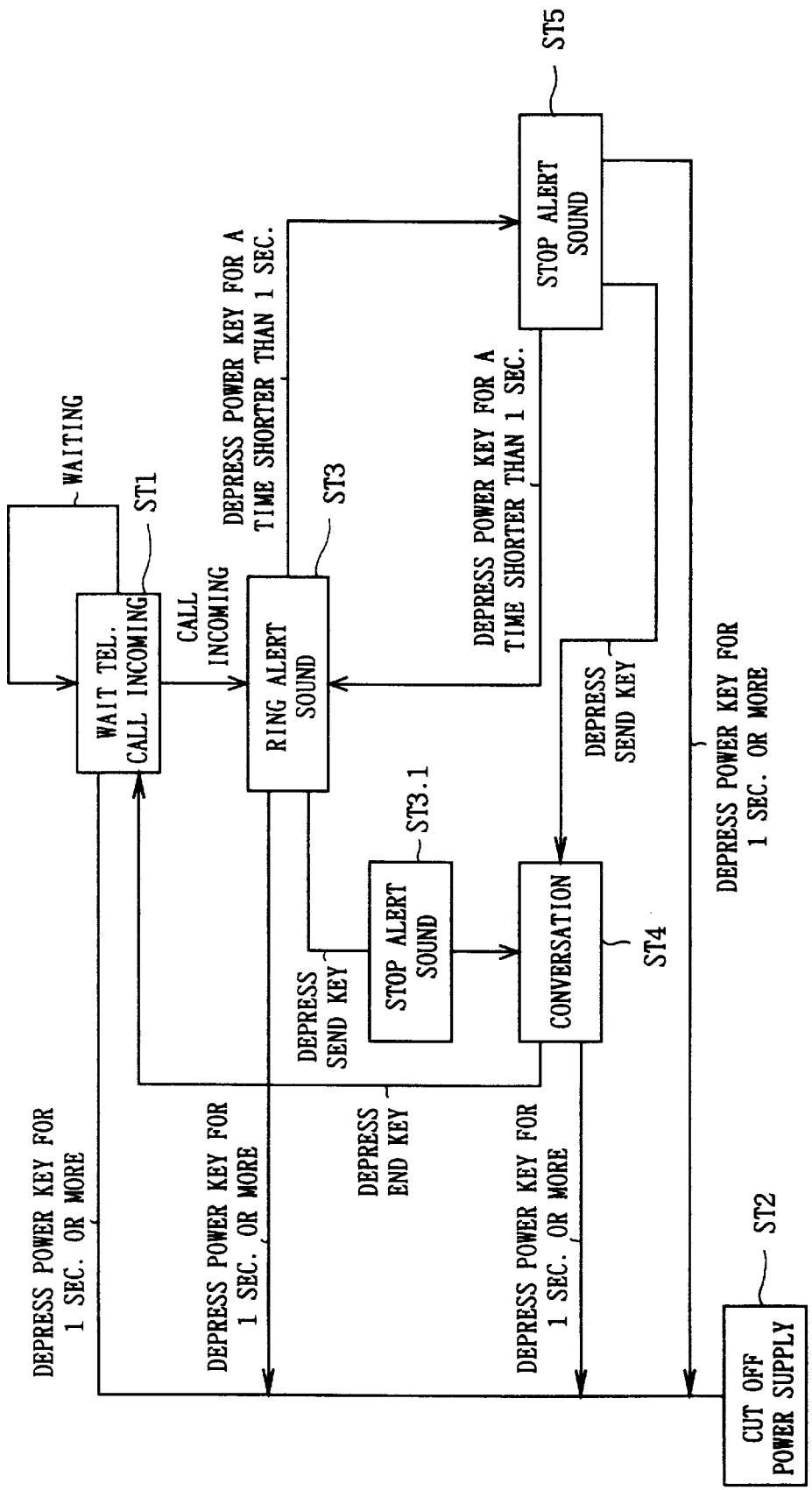
FIGS. 3 to 5 are schematic diagrams showing the state transition.

Next, referring to FIG. 3, description will be made about the operation and the state transition when call incoming is given to the portable telephone 1.

The operation at the time of call incoming begins from the state ST1 of telephone call incoming standing-by. The portable telephone 1 maintains this state ST1 before confirmation of telephone call incoming. Incidentally, if the power key 3A is depressed for one second or more in this state, the operation shifts to power supply cutting off in the state ST2.

If telephone call incoming is confirmed in the state ST1, the operation shifts to the state ST3 in which an alert sound is generated to inform the user of the call incoming. In the case where the user wishes to respond to the call incoming in this state ST3, the user depresses the send key 3C to shift the state ST3.1 to stop the alert sound, thereafter the state shifts to the state ST4 to start conversation.

In this state ST4, if the user depresses the end key 3D, the operation shifts to the call incoming waiting state ST1, while if the user depresses the power key 3A for one second or more, the operation shifts to the state ST2.

Also in the case where the user depresses the power key 3A for one second or more in the state ST3 where an alert sound is being generated, the operation shifts to the state ST2.

If the power supply is broken off forcibly in such a state where an alert sound is being generated, there is a fear that the other party who transmitted the call may be given an unpleasant feeling or a kind of misunderstanding because the other party can notice the fact that the person on the reception side did not respond to the call intentionally. To cope with this point, there is provided a new function to which the state ST5 corresponds.

That is, in the case where it is impossible to allow an alert sound to ring for a long time continuously in view of the characteristic of the portable telephone 1 which is generally used in public spaces, the user may depress the power key 3A for a time shorter than one second in the state ST3. By such an operation, the CPU 7 performs control to turn off the alert on/off controller 12 to only stop the generation of the alert sound. This operation does not give any unnecessary unpleasant feeling to the other party because this operation does not cause cutting-off of the circuit. Further, since the user can stop the alert sound, such a situation that persons in the surroundings are troubled by the alert sound can be avoided.

Incidentally, if the user depresses the power key 3A for a time shorter than one second in the state ST5, the operation is returned to the state ST3 where the alert sound is rung, so that the user can easily confirm whether the call origination is continued or not.

It is a matter of course that, when the user wishes to start conversation in the duration of stopping the alert sound, the user may depress the send key 3C so as to shift the state from the state ST5 to the state ST4 to thereby make it possible to start conversation. Further, if the user depresses the power key 3A for one second or more in the state ST4, the state shifts to the state ST2.

The above is the description about the state transition which the portable telephone 1 can take upon call incoming.

In the above configuration, the user can stop an alert sound without breaking-off connection of the telephone circuit by depressing the power key 3A for a short time (for a time shorter than one second in this example), so that it is possible to reduce trouble by an alert sound being heard by persons in the surroundings.

The effect is remarkable particularly in the case of such a portable telephone 1 which is generally used in public places gathering many and unspecified persons.

Further, since the design is made such that when the user depresses the power key 3A again for a short time in the duration of stopping an alert sound, the state is returned to the original state, that is, the state ST3, so that the user's selection of use increases and the operation property can be improved.

(3) Other Embodiments

In the aforementioned embodiment, description has been made about a case where not only a telephone number entered by a user but also various mode selection scene are displayed on the picture screen of the display 4. However, the present invention is not limited to such an embodiment but is applicable to a case where the telephone number of the other party is displayed in the case of using a service in which the telephone number of the other party is displayed upon reception of call incoming. If this function is combined with the above-mentioned function of eliminating an alert sound, a user can select suitably a measure so as not to act in an impolite manner in accordance with a person of the other party, so that the user's convenience in handling can be improved.

In the aforementioned embodiments, description has been made about a case where an alert sound is stopped when the power key 3A is depressed for a time shorter than one second in the condition that the alert sound is ringing while the power supply is broken off when it is depressed for a time not shorter than one second in the same condition. However, the boundary value of the depression time is not only limited to one second.

Figure 4:
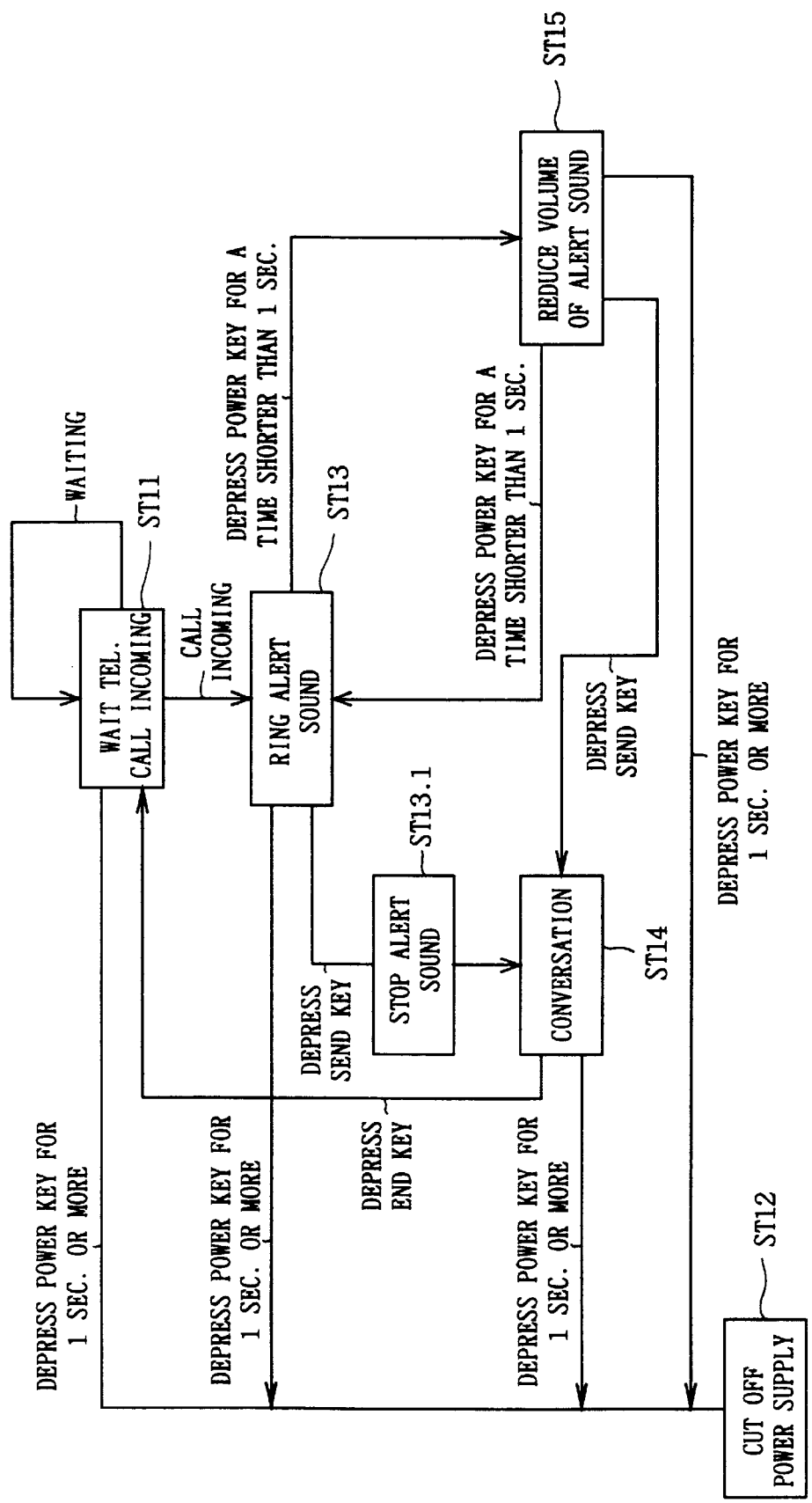
Figure 5:
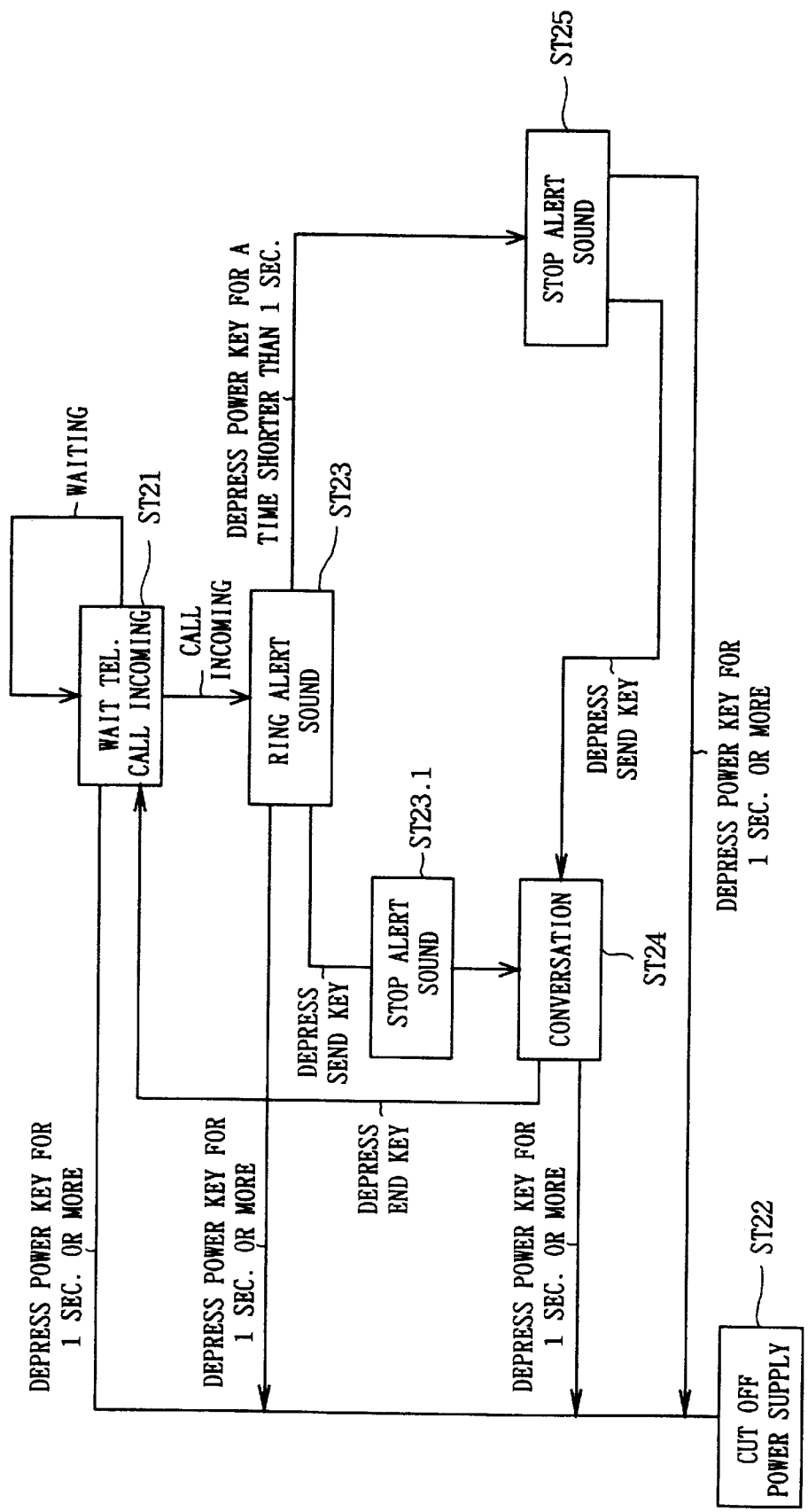

In the aforementioned embodiments, description has been made about a case where an alert sound is stopped when the power key 3A is depressed in the condition that the alert sound is ringing. However, the present invention is not limited to these embodiments but is applicable widely also to a case where the volume of an alert sound is reduced. FIG. 4 shows this state. FIG. 4 is an example of approximately the same state transition as FIG. 3, however, only the state ST15 of FIG. 5 is different from the corresponding state ST5 of FIG. 3, in which the processing of reducing the volume of an alert sound is performed.

In the aforementioned embodiments, description has been made about a case where there is provided a function (toggle function) in which when the power key 3A is depressed again for a short time under the state ST5, ST15 that an alert sound is stopped by the alert sound stopping function allotted to the power key 3A, the state is returned to the state ST3, ST13 where the alert sound can be rung. However, the present invention is not limited to these embodiments but the state transition may be set to be one way. More specifically, as shown in FIG. 5, there is no change under the state ST25 even if the power key 3A is depressed for a time shorter than one second. In this example, a user cannot ring an alert sound again after having stopped the alert.

In this example, the situation can be prevented where the user rings an alert sound erroneously by user's misoperation, therefore, persons in the surroundings being troubled by an alert sound can be avoided. It can be said that this example has another effect from FIG. 3.

Further, in the aforementioned embodiments (FIGS. 3 to 5), description has been made about a case where an alert sound is stopped or the volume of an alert sound is reduced continuously from immediately after the power key 3A is depressed for a short time under the condition that the alert sound is ringing. However, this duration is not only limited to just when the power key 3A is depressed but may be when after predetermined time.

In the aforementioned embodiments, description has been made about a case where the alert sound stopping function and the volume reducing function is allotted to the power key 3A which is designed to cut off the power supply when the power key 3A is depressed for a predetermined time or more. However, the present invention is not limited to these embodiments but an additional key may be further provided so that the alert sound stopping function or the volume reducing function is allotted exclusively to this additional key, or the alert sound stopping function or the volume reducing function is allotted to any one of the above-mentioned keys other than the power key 3A.

In the aforementioned embodiments, description has been made about a case where a display having a function to display various information is provided with a portable telephone 1 in one body.

However, the present invention is not limited to this case but is widely applicable to portable telephones not having such a display.

Further, in the aforementioned embodiments, description has been made about a portable telephone 1. However, the present invention is not limited to such a portable telephone but is widely applicable to information terminal equipment having a communication function, as well as to hard-wire telephones.

According to the present invention, as described above, configuration is made such that when a user effects a predetermined operation under the condition that an alert sound is ringing, the alert sound is stopped or the volume of the alert sound is reduced at least over a duration of call incoming, so that such a fear that persons in the surroundings may be troubled by the continuous ringing of the alert sound can be remarkably reduced.

Further, the situation that power supply is cut off forcibly during call origination can be avoided, so that such a fear that a person on the call origination side may be given an unpleasant feeling can be reduced.

While there has been described in connection with the preferred embodiments of the invention, it will be obvious to those skilled in the art that various changes and modifications may be made, therefore, the appended claims are provided to cover all such changes and modifications as fall within the true spirit and scope of the invention.

What is claimed is:

1. A communication terminal for informing a user of a received call from a remote caller by an alert sound, comprising:
    an alert sound generator for generating the alert sound when the call is received from the remote caller;
    control means for controlling said alert sound generator; and
    means for specifying a predetermined operation by the user,
    wherein when said alert sound generator is generating the alert sound and said means for specifying said predetermined operation is operated by the user, said control means controls said alert sound generator to change a volume of the generated alert sound only for the received call, without affecting the volume of the alert sound for future received calls, while leaving a call ringing state, as perceived by the remote caller, of the call to the terminal from the remote caller unchanged.

2. The communication terminal according to claim 1, wherein
    said control means controls the state of said alert sound generator to stop the sound.

3. The communication terminal according to claim 1, wherein
    said control means controls the state of said alert sound generator to reduce the volume of the sound.

4. The communication terminal according to claim 1, wherein said predetermined operation is an operation depressing a predetermined operation key.

5. The communication terminal according to claim 4, wherein said operation key is a power key to turn on or break off connection between said terminal and a power supply.

6. The communication terminal according to claim 5, wherein said control means includes disconnection means for turning off power supplied by said power supply when said power key is depressed for at least a predetermined period of time and wherein said predetermined operation occurs when said power key is depressed for a time shorter than said predetermined period of time.

7. The communication terminal according to claim 6, wherein said predetermined period of time for depressing said power key is substantially equal to one second.

8. The communication terminal according to claim 6, wherein said control means again changes the state of said alert sound generator when said predetermined operation occurs again, after said predetermined operation has occurred a first time.

9. The communication terminal according to claim 8, wherein
    said control means controls the state of said alert sound generator to stop an alert sound and then to generate the sound again.

10. The communication terminal according to claim 8, wherein said control means controls the state of said alert sound generator to reduce an audible volume levels of the sound and subsequently to restore said volume level of the sound to an unreduced level.

11. The communication terminal according to claim 1, further comprising display means for displaying information regarding said remote caller.

12. The communication terminal according to claim 1, further comprising:
    RF signal processing means for transmitting and/or receiving radio waves; and
    an antenna for transmitting and/or receiving said radio waves, wherein said communication status between said apparatus and said remote caller is established by said transmitted and/or received radio waves.

13. A method of informing a user of a received call from a remote caller to a communication apparatus, comprising the steps of:
    waiting to receive a call;
    generating an alert sound upon receiving said call; and
    changing a volume of the generated alert sound only for said call when the alert sound is being generated and a predetermined operation is specified by the user, without affecting the volume of the alert sound for subsequent future received calls, while leaving a call ringing status, as perceived by the remote caller, of the call from the remote caller to the communication apparatus unchanged.

14. The method of informing a user of a received call according to claim 13, wherein said predetermined operation comprises depressing a predetermined key for a time shorter than a predetermined period of time.

15. The method of informing a user of a received call according to claim 14, wherein said predetermined key is a power key to turn on or break off a supply of power to said communication apparatus.

16. The method of informing a user of a received call according to claim 14, wherein said predetermined period of time is substantially equal to one second.

17. The method of informing a user of a received call according to claim 13, wherein said step of changing the state of the alert sound includes the step of toggling said predetermined operation.

18. The method of informing a user of a received call according to claim 13, wherein said state of the alert ringing sound is changed to the state where said alert sound is stopped.

19. The method of informing a user of a received call according to claim 13, wherein said state of the alert ringing sound is changed to the state where a volume level of said alert sound is reduced.

* * * * *